United States Patent
Armoni et al.

(10) Patent No.: US 10,140,405 B2
(45) Date of Patent: Nov. 27, 2018

(54) METHOD AND APPARATUS FOR FINDING LOGIC EQUIVALENCE BETWEEN REGISTER TRANSFER LEVEL AND POST SYNTHESIS NETS

(71) Applicant: Mellanox Technologies, Ltd., Yokneam (IL)

(72) Inventors: Roy Armoni, Givat Ada (IL); Or Davidi, Reut (IL)

(73) Assignee: Mellanox Technologies, Ltd, Yokneam (IL)

( * ) Notice: Subject to any disclaimer, the term of this patent is extended or adjusted under 35 U.S.C. 154(b) by 15 days.

(21) Appl. No.: 15/387,958

(22) Filed: Dec. 22, 2016

(65) Prior Publication Data

US 2018/0181683 A1    Jun. 28, 2018

(51) Int. Cl.
*G06F 17/50* (2006.01)

(52) U.S. Cl.
CPC ........ *G06F 17/505* (2013.01); *G06F 17/5022* (2013.01)

(58) Field of Classification Search
CPC ............................ G06F 17/505; G06F 17/5022
USPC .......................................................... 716/104
See application file for complete search history.

(56) References Cited

U.S. PATENT DOCUMENTS

| | | | |
|---|---|---|---|
| 2006/0010342 A1* | 1/2006 | Kanamaru | G06F 17/504 714/6.32 |
| 2008/0127014 A1* | 5/2008 | Pandey | G06F 17/5045 716/103 |
| 2008/0127015 A1* | 5/2008 | Chandramouli | G06F 17/5022 716/103 |
| 2016/0328506 A1* | 11/2016 | Shupe | G06F 17/5045 |

* cited by examiner

*Primary Examiner* — Suchin Parihar
(74) *Attorney, Agent, or Firm* — Alston & Bird LLP

(57) ABSTRACT

A method, computer program, and apparatus are described for finding the logical equivalence between register transfer level (RTL) wires and post synthesis nets in a netlist. In some example embodiments, the method includes minimizing nets in a netlist and matching each RTL wire to a netlist net. In some example embodiments, the method also includes determining if an RTL wire is logically equivalent to a netlist net. In some example embodiments, the method also includes determining a new candidate for a net if the RTL wire and associated netlist net are not logically equivalent.

15 Claims, 6 Drawing Sheets

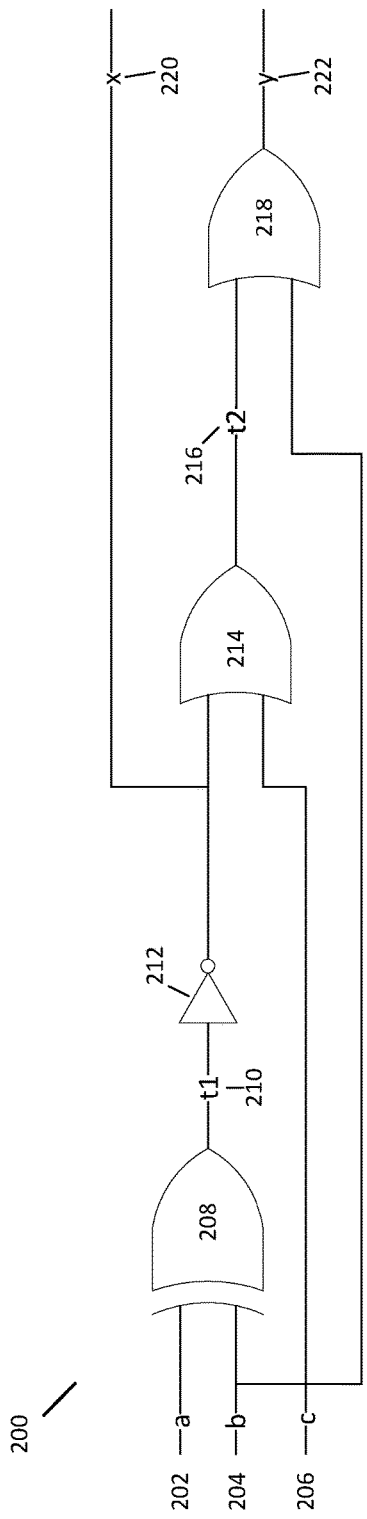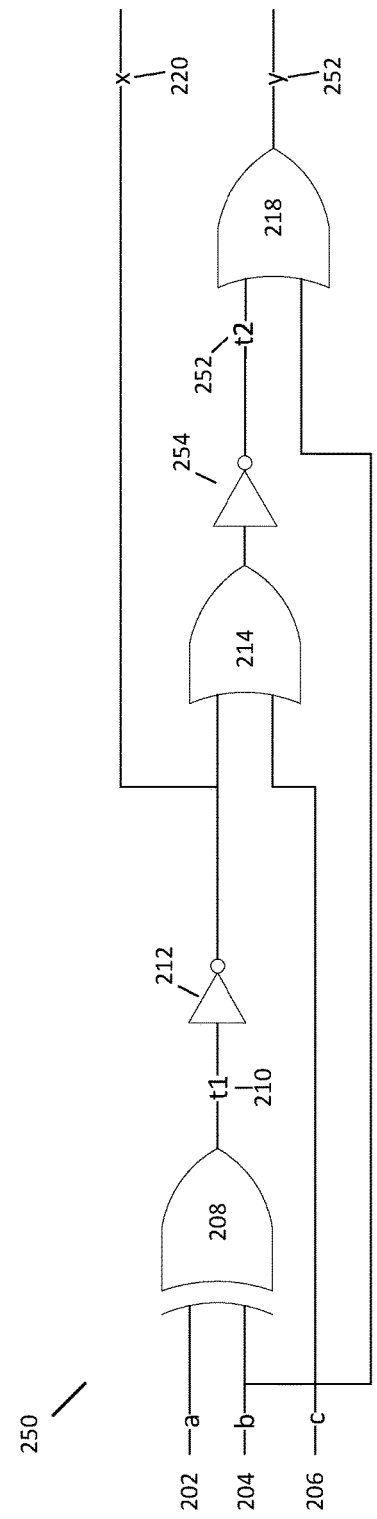
FIG. 2A
FIG. 2B

METHOD AND APPARATUS FOR FINDING LOGIC EQUIVALENCE BETWEEN REGISTER TRANSFER LEVEL AND POST SYNTHESIS NETS

TECHNOLOGICAL FIELD

Embodiments of the present invention relate generally to simplifying and optimizing electronic circuit production including the circuit design and production processes.

BACKGROUND

This present invention relates to the production of electronic circuits and electronic circuit chip design. During the design of electronic circuit chips, errors or bugs maybe be present in the design abstraction levels, such as the register transfer level (RTL). In some cases, these errors or bugs may only be detected after the design abstraction has been synthesized to a less abstract level or the design has been synthesized to the transistor level of the electronic circuit chip.

BRIEF SUMMARY

Embodiments of the present invention identify and correct errors in the RTL abstraction level during post synthesis design. One of the primary stages of the digital circuit chip design process is a synthesis of an RTL abstract design into a gate level netlist. The process then continues to physical design and layout. Each of the steps in this process are time consuming and resource intensive activities. During the physical design and layout stages, verification and error (bug) fixing continues on the RTL abstract design. When a bug is detected, a correction for the detected bug in the netlist is called an Engineering Change Order (ECO). In implementing an ECO, a primary challenge is to map RTL wires, through which a fix to the bug is implemented, to their netlist counterparts. In some examples, this mapping requires a time- and resource-intensive re-synthesis process. The method and apparatus described herein avoid re-synthesis by mapping every RTL wire to its equivalent nets in the netlist through finding the logical equivalents between RTL wires and post synthesis nets in a netlist.

In this regard, the invention includes methods, computer programs products, and apparatuses for finding logic equivalence between register transfer level and post synthesis nets. In one example embodiment, a method for finding logical equivalence between a register transfer level abstraction and a synthesized netlist comprises: receiving a register transfer level abstraction and a synthesized netlist of the register transfer level abstraction, storing the register transfer level abstraction and the synthesized netlist into an equivalence representation model, associating one or more netlist terminals with one or more corresponding register transfer level entities based on a name of the register transfer level entity matching a name of a netlist terminal, and simplifying the register transfer level abstraction and the synthesized netlist. The method of this example embodiment also comprises: minimizing one or more nets in the netlist by: determining immediate operands for each of the one or more nets, determining if the one or more nets of the netlist are logical equivalents based on the determined immediate operand, and associating the one or more determined nets and storing the associations in the equivalence representation model. The method of this example embodiment also further comprises: matching each register transfer level wire to a netlist net by: traversing the register transfer level abstraction from a bottom wire to a top wire of the abstraction, minimizing each wire in the register transfer level abstraction by: determining immediate operands for each of the one or more register transfer level wires, determining if the register transfer level wire is a logical equivalent to one or more of the stored associated nets, and associating each register transfer wire with a determined equivalent net and storing the associations in the equivalence representation model. The method of this example embodiment further comprises determining from the associations of the entities and terminals if each register transfer level wire is associated with a net of the same name, determining if each wire and net of the same name are logically equivalent, determining a new candidate for a net if a wire and net of the same name are not logically equivalent, and storing the new candidate net in the equivalence representation model.

In another example embodiment, a method for finding logical equivalence between a register transfer level abstraction and a synthesized netlist comprises further comprises: running a simulation for the netlist and for register transfer level abstraction, prior to matching each register transfer level wire to a netlist net, and storing a simulation output for the netlist and for register transfer level abstraction in the equivalence representation model. The example method of this embodiment also includes: wherein determining if each wire and net of the same name are logically equivalent further comprises: determining for each register transfer level wire, every netlist net originating from a same input, and determining if the determined netlist nets from the same input are logically equivalent by comparing the simulation results of for the each determined netlist net and register transfer level wire from the same input.

In a further example embodiment, a method for finding logical equivalence between a register transfer level abstraction and a synthesized netlist may also include: wherein simplifying the register transfer level abstraction and the synthesized netlist further comprises: determining non-logical nets in the netlist and turning the determined non-logical nets off in the equivalence representation model, determining which register transfer level entities are not represented by a netlist terminal and removing the determined entities from the equivalence representation model, determining a replacement logic level for the removed entities utilizing a satisfiability (SAT) solver, and storing the determined level in the equivalence representation model.

Additionally, in some cases, a method for finding logical equivalence between a register transfer level abstraction and a synthesized netlist further comprises: wherein determining if each wire and net of the same name are logically equivalent further comprises utilizing a satisfiability (SAT) solver.

In some further example cases, a method for finding logical equivalence between a register transfer level abstraction and a synthesized netlist further comprises: wherein determining if the one or more nets of the netlist are logical equivalents based on the determined immediate operand comprises utilizing a truth table to determine logical equivalents of the netlist nets.

In a further example embodiment, a method for finding logical equivalence between a register transfer level abstraction and a synthesized netlist further comprises: wherein the one or more netlist terminals and the register transfer level entities comprise one of a flip-flop, a register, a wire, an input, or an output.

One example embodiment comprises a computer program product for finding logical equivalence between a register transfer level abstraction and a synthesized netlist comprising: at least one computer readable non-transitory memory medium having program code instructions stored thereon, the program code instructions which when executed by an apparatus cause the apparatus at least to: receive a register transfer level abstraction and a synthesized netlist of the register transfer level abstraction, store the register transfer level abstraction and the synthesized netlist into an equivalence representation model, associate one or more netlist terminals with one or more corresponding register transfer level entities based on a name of the register transfer level entity matching a name of a netlist terminal, simplify the register transfer level abstraction and the synthesized netlist, minimize one or more nets in the netlist by: determining immediate operands for each of the one or more nets, determining if the one or more nets of the netlist are logical equivalents based on the determined immediate operand, and associating the one or more determined nets and storing the associations in the equivalence representation model. The computer program of this embodiment further comprises program code instructions which when executed by an apparatus cause the apparatus at least to match each register transfer level wire to a netlist net by: traversing the register transfer level abstraction from a bottom wire to a top wire of the abstraction, minimizing each wire in the register transfer level abstraction by: determining immediate operands for each of the one or more register transfer level wires, determining if the register transfer level wire is a logical equivalent to one or more of the stored associated nets, and associating each register transfer wire with a determined equivalent net, and storing the associations in the equivalence representation model. The computer program of this embodiment also further comprises program code instructions which when executed by an apparatus cause the apparatus to at least determine from the associations of the entities and terminals if each register transfer level wire is associated with a net of the same name, determine if each wire and net of the same name are logically equivalent, and determine a new candidate for a net if a wire and net of the same name are not logically equivalent and store the new candidate net in the equivalence representation model.

In another example, a computer program product for finding logical equivalence between a register transfer level abstraction and a synthesized netlist further comprises program code instructions which when executed by an apparatus cause the apparatus to at least run a simulation for the netlist and for register transfer level abstraction, prior to matching each register transfer level wire to a netlist net, store a simulation output for the netlist and for register transfer level abstraction in the equivalence representation model, determine if each wire and net of the same name are logically equivalent by: determining for each register transfer level wire, every netlist net originating from a same input, and determining if the determined netlist nets from the same input are logically equivalent by comparing the simulation results of for the each determined netlist net, and register transfer level wire from the same input.

In a further example embodiment, a computer program product for finding logical equivalence between a register transfer level abstraction and a synthesized netlist further comprises program code instructions which when executed by an apparatus cause the apparatus to at least match each register transfer level wire to a netlist net by: traversing the register transfer level abstraction from a bottom wire to a top wire of the abstraction, minimizing each wire in the register transfer level abstraction by: determining an immediate operand for each of the one or more register transfer level wire, determining if the register transfer level wire is a logical equivalent to one or more of the stored associated nets, and associating each register transfer wire with a determined equivalent net and storing the associations in the equivalence representation model.

In a another example embodiment, a computer program product for finding logical equivalence between a register transfer level abstraction and a synthesized netlist further comprises program code instructions which when executed by an apparatus cause the apparatus to at least simplify the register transfer level abstraction and the synthesized netlist by: determining non-logical nets in the netlist and turning the determined non-logical nets off in the equivalence representation model, determining which register transfer level entities are not represented by a netlist terminal, and removing the determined entities from the equivalence representation model, determining a replacement logic level for the removed entities utilizing a satisfiability (SAT) solver, and storing the determined level in the equivalence representation model.

In a further example embodiment, a computer program product for finding logical equivalence between a register transfer level abstraction and a synthesized netlist further comprises program code instructions which when executed by an apparatus cause the apparatus to at least determine if each wire and net of the same name are logically equivalent by utilizing a satisfiability (SAT) solver.

In another example embodiment, a computer program product for finding logical equivalence between a register transfer level abstraction and a synthesized netlist further comprises program code instructions which when executed by an apparatus cause the apparatus to at least determine if the one or more nets of the netlist are logical equivalents based on the determined immediate operand by utilizing a truth table to determine logical equivalents of the netlist nets.

In a further example embodiment, a computer program product for finding logical equivalence between a register transfer level abstraction and a synthesized netlist further comprises: wherein the one or more netlist terminals and the register transfer level entities comprise one of a flip-flop, a register, a wire, an input, or an output.

In a further example embodiment, a computer program product for finding logical equivalence between a register transfer level abstraction and a synthesized netlist further comprises program code instructions which when executed by an apparatus cause the apparatus to at least update the netlist net with the stored new candidate net before manufacturing a digital circuit chip.

A further example embodiment includes an apparatus for finding logical equivalence between a register transfer level abstraction and a synthesized netlist. For example, an apparatus may comprise at least one processor and at least one memory including computer program code, the at least one memory and the computer program code configured to, with the processor, cause the apparatus to at least: receive a register transfer level abstraction and a synthesized netlist of the register transfer level abstraction, store the register transfer level abstraction and the synthesized netlist into an equivalence representation model, associate one or more netlist terminals with one or more corresponding register transfer level entities based on a name of the register transfer level entity matching a name of a netlist terminal, and simplify the register transfer level abstraction and the synthesized netlist. The example apparatus of this embodiment may be further configured to minimize one or more nets in the netlist by: determining immediate operands for each of the one or more nets, determining if the one or more nets of the netlist are logical equivalents based on the determined immediate operand, and associating the one or more determined nets and storing the associations in the equivalence representation model. The example apparatus of this embodiment may be further configured to: match each register transfer level wire to a netlist net by: traversing the register transfer level abstraction from a bottom wire to a top wire of the abstraction, minimizing each wire in the register transfer level abstraction by: determining immediate operands for each of the one or more register transfer level wires, determining if the register transfer level wire is a logical equivalent to one or more of the stored associated nets, and associating each register transfer wire with a determined equivalent net and storing the associations in the equivalence representation model. The example apparatus of this embodiment may also be configured to determine from the associations of the entities and terminals if each register transfer level wire is associated with a net of the same name, determine if each wire and net of the same name are logically equivalent, and determine a new candidate for a net if a wire and net of the same name are not logically equivalent and store the new candidate net in the equivalence representation model.

BRIEF DESCRIPTION OF THE DRAWINGS

Figure 1:
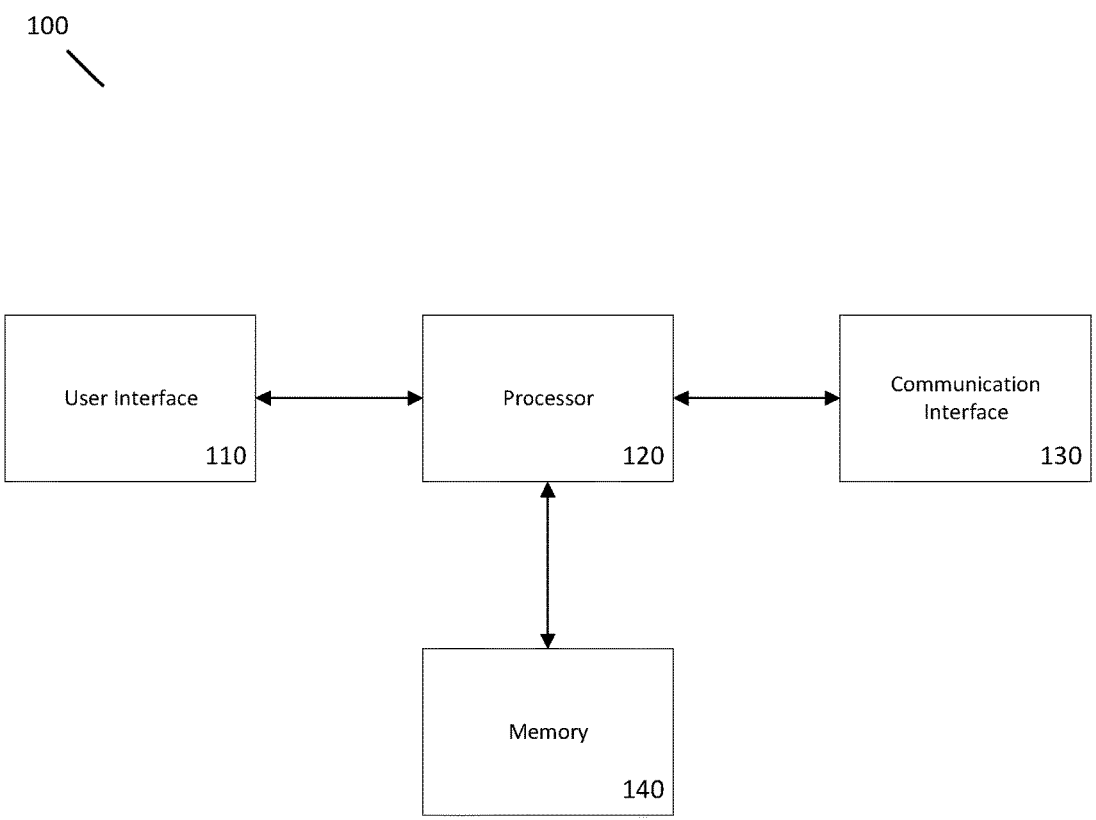
Figure 3A:
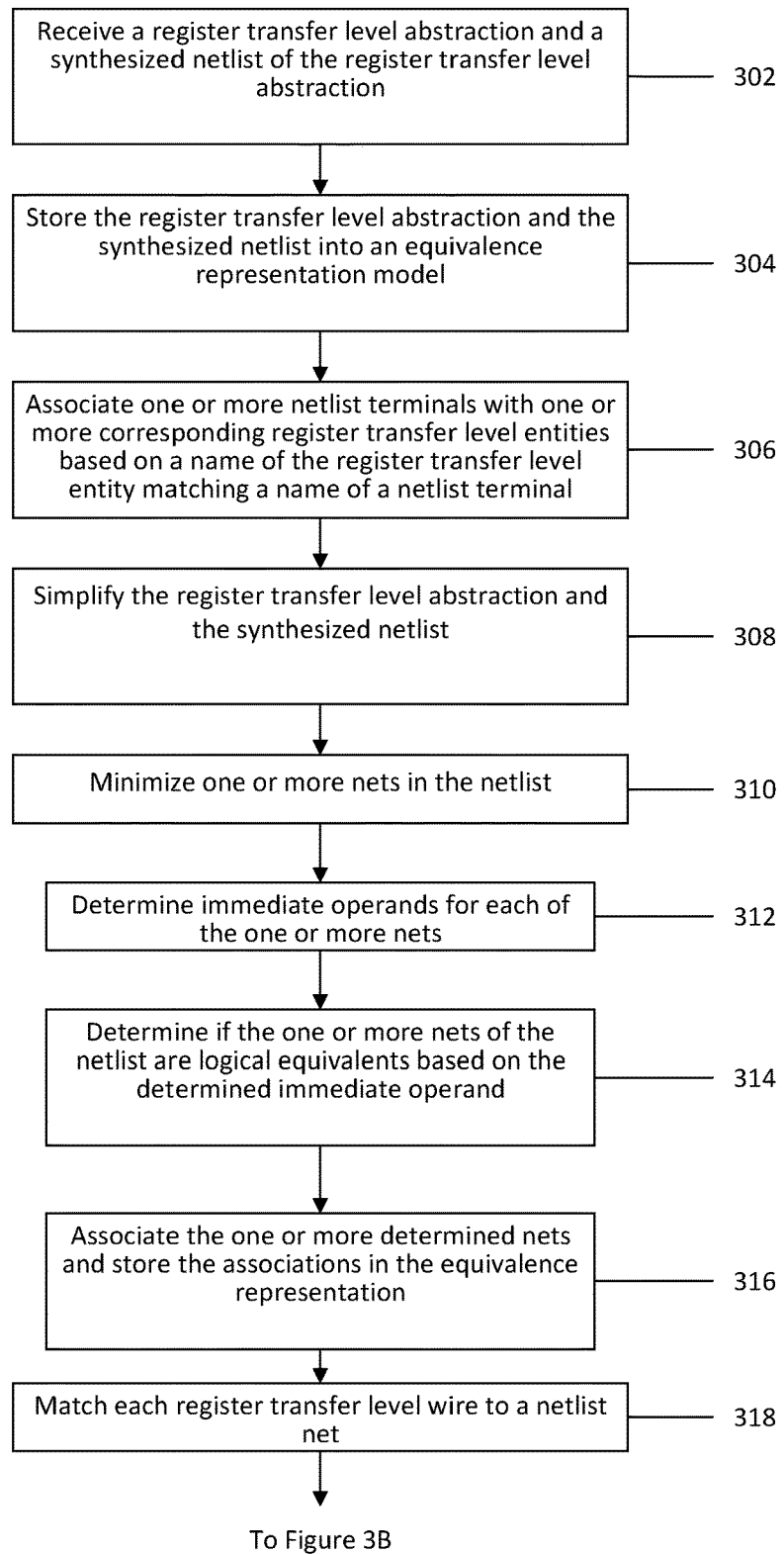
Figure 3B:
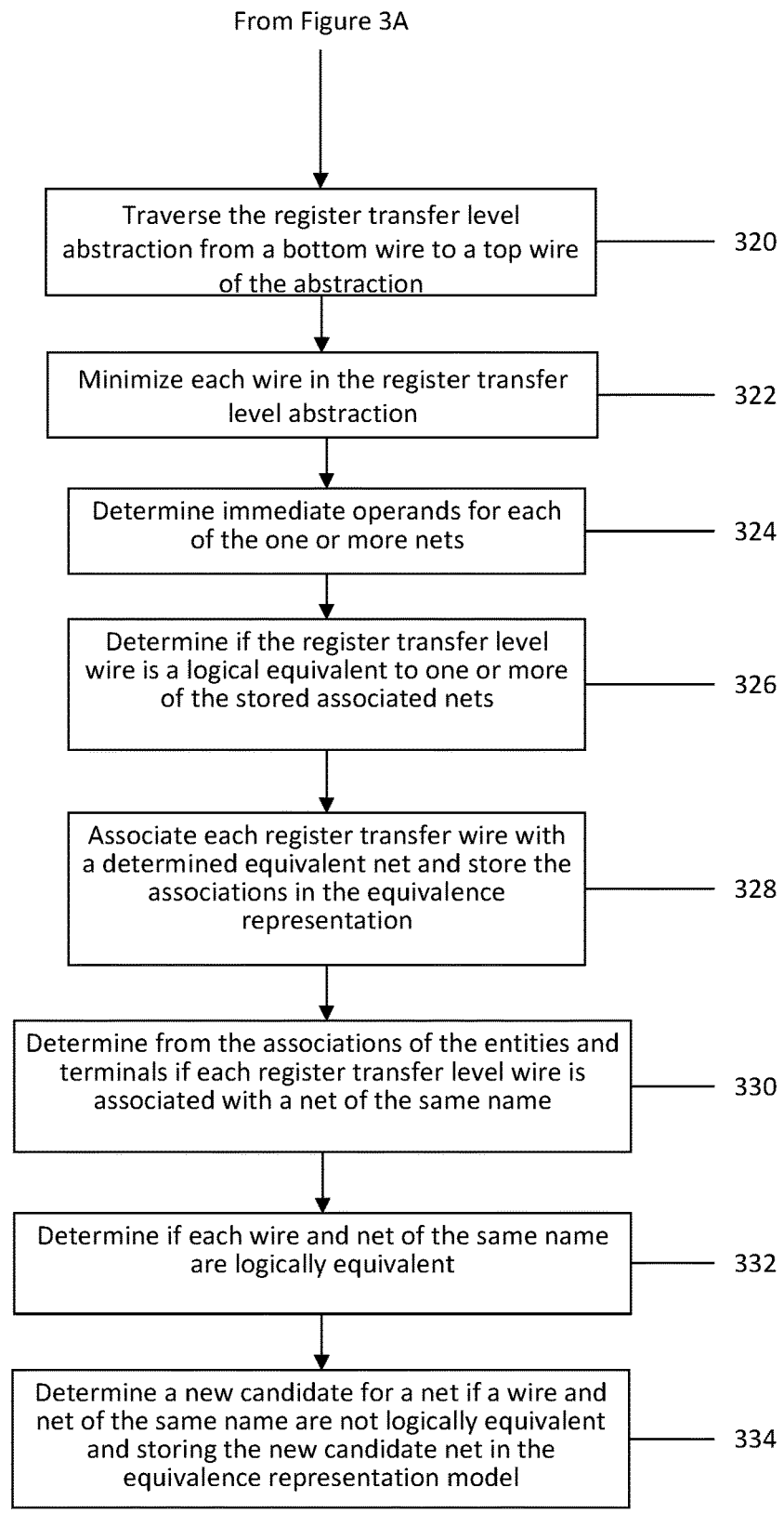
Figure 4:
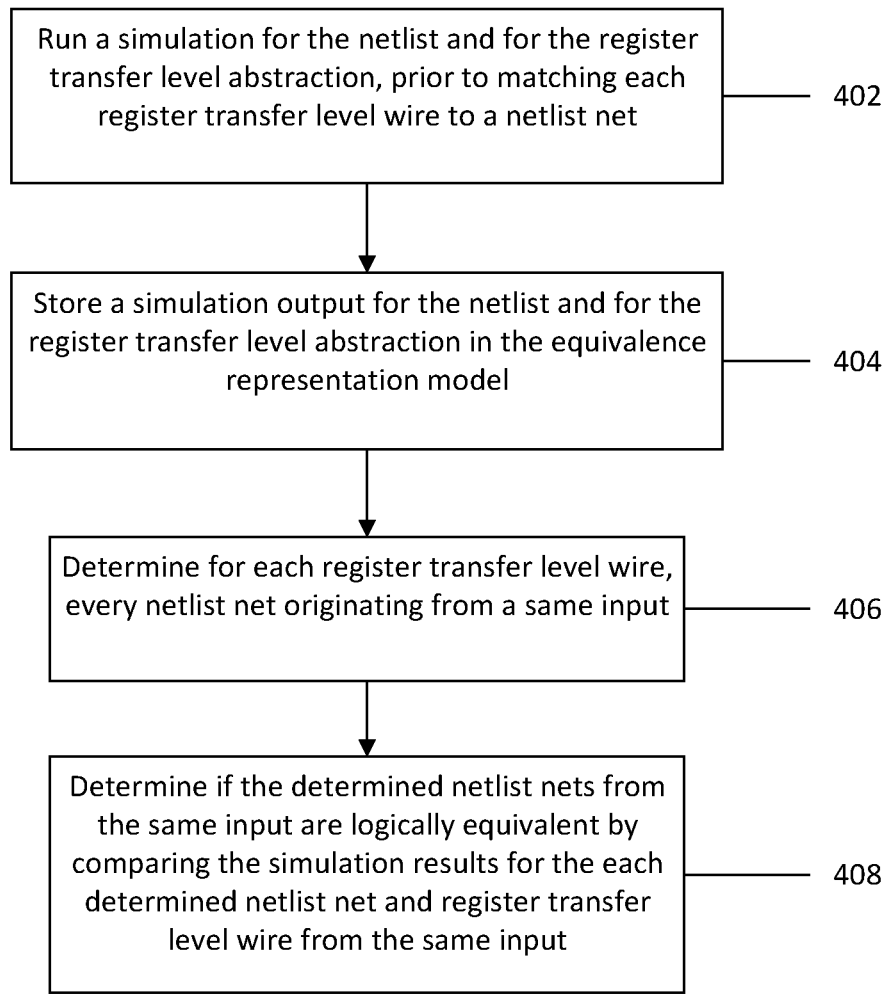
Figure 5:
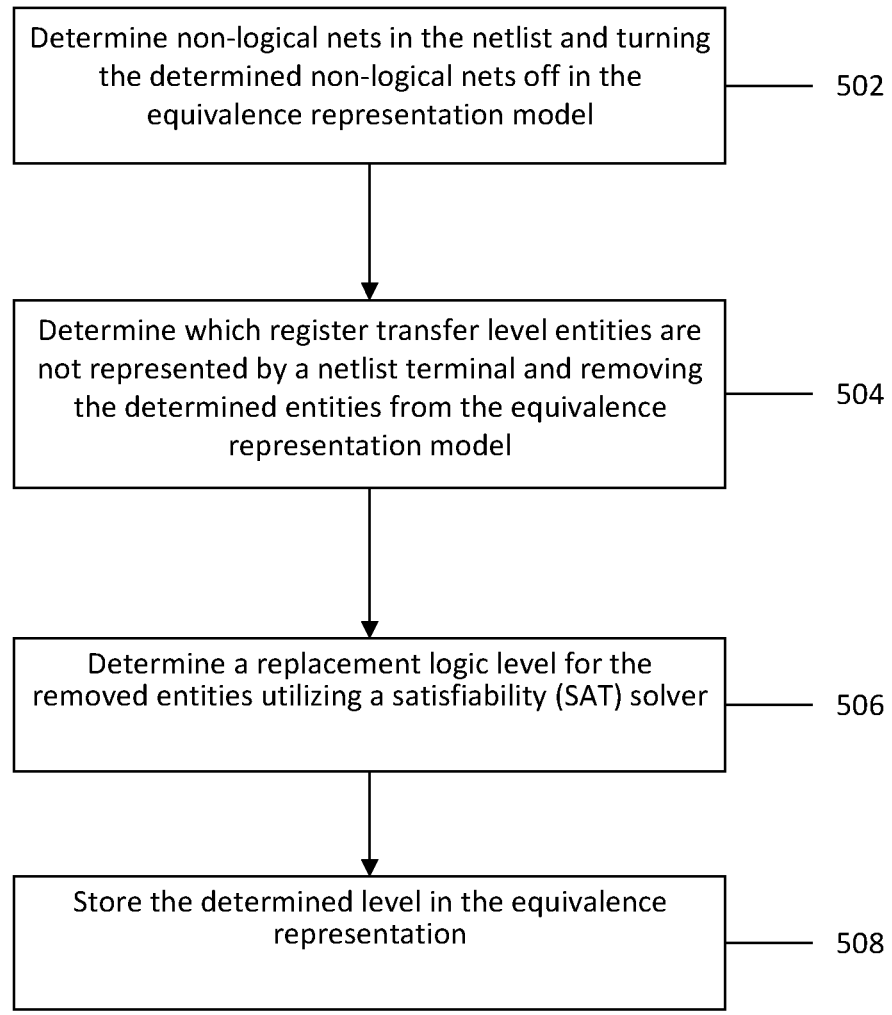

Having thus described embodiments of the invention in general terms, reference will now be made to the accompanying drawings, which are not necessarily drawn to scale, and wherein:

FIG. 1 illustrates a block diagram of an example apparatus for finding the logical equivalence between RTL wires and post synthesis nets in a netlist;

FIG. 2A illustrates an example visual representation of a netlist representing RTL code that includes a bug;

FIG. 2B illustrates an example visual representation of the netlist of FIG. 2A representing corrected RTL code;

FIGS. 3A and 3B are a flowchart illustrating an example method for finding the logical equivalence between RTL wires and post synthesis nets in a netlist;

FIG. 4 is a flowchart illustrating an example method for finding the logical equivalence between RTL wires and post synthesis nets in a netlist utilizing a simulation; and FIG. 5 is a flowchart illustrating an example method for finding the logical equivalence between RTL wires and post synthesis nets in a netlist further comprising removing redundant or unneeded RTL wires and netlist nets.

DETAILED DESCRIPTION

In the design process of an integrated circuit, an RTL code, which is a representation of the RTL abstraction, is ultimately converted into a gate-level netlist. The gate-level netlist is the physical description of the connectivity of the integrated circuit among the gates (terminal/pins) of the circuit. During the synthesis process from RTL code to the gate-level netlist, the original RTL signals and logic are converted and lost while new nets in the netlist are created. The new nets in the netlist are used to infer the RTL signals and logic from the RTL code design. As synthesis of the electronic chip design progresses, more and more RTL code is converted into nets and the netlist becomes highly interconnected and expansive. Once a netlist becomes very large, correcting errors and eliminating bugs using conventional methods is typically very expensive, both in terms of time and resource allocation. For example, when a bug in the RTL code is found in an integrated electronic chip already in advanced synthesis process, it becomes necessary to correct the bug in the RTL and then resynthesize the entire netlist. This process can take many hours and require significant processing power.

In the embodiments described below, when a bug (error) is discovered in the RTL code, the bug fix is implemented in netlist terms, as updated nets, on the original netlist, without resynthesizing the RTL code. This avoids the need to resynthesize an entire netlist, advantageously saving both time and resources in the updating of the netlist to correct the bug. Implementing a fix directly in the netlist without re-synthesizing requires an understanding of where the fix should take place in the netlist. In some examples, this means determining which nets, in the netlist, should be changed and what the new value should be changed to in order to correct the bug in the RTL code.

According to the embodiments described herein, during the synthesis process, several optimizations may occur. In the synthesis process, for example, it is not trivial to find the netlist equivalence to most of the wires. Embodiments of the invention find a match between each RTL wire and its equivalent netlist net bottom-up while using a Boolean satisfiability (SAT) solver to prove the equivalence. The software output thus provides a mechanism for making netlist fixes more efficiently.

Example embodiments will now be described more fully hereinafter with reference to the accompanying drawings, in which some, but not all, embodiments are shown. Indeed, the embodiments may take many different forms and should not be construed as limited to the embodiments set forth herein; rather, these embodiments are provided so that this disclosure will satisfy applicable legal requirements. Like reference numerals refer to like elements throughout. The terms "data," "content," "information," and similar terms may be used interchangeably, according to some example embodiments, to refer to data capable of being transmitted, received, operated on, and/or stored. Moreover, the term "exemplary," as may be used herein, is not provided to convey any qualitative assessment, but instead merely to convey an illustration of an example. Thus, use of any such terms should not be taken to limit the spirit and scope of embodiments of the present invention.

An example embodiment of the invention will now be described with reference to FIG. 1, in which certain elements of an apparatus 100 for finding the logical equivalence between RTL wires and post synthesis nets in a netlist are depicted. The apparatus of FIG. 1 may be employed, for example, in conjunction with, such as by being incorporated into or embodied by, the computing device that includes or is otherwise associated with the display upon which a visual representative of the RTL wires or netlist nets may be presented. For example, the apparatus may be embodied by a mobile terminal or a fixed computing device that includes or is otherwise associated with the display. Alternatively, the apparatus may be separate from the computing device or at least separate from the display that is associated with the computing device, but the apparatus of this embodiment may be in communication with the computing device, such as via wireline or wireless communications, in order to direct the presentation of the visual representative of the RTL wires or netlist nets upon the display.

It should also be noted that while FIG. 1 illustrates one example of a configuration of an apparatus 100 for finding the logical equivalence between RTL wires and post synthesis nets in a netlist, numerous other configurations may also be used to implement embodiments of the present invention. As such, in some embodiments, although devices or elements are shown as being in communication with each other, hereinafter such devices or elements should be considered as capable of being embodied within the same device or element and thus devices or elements shown in communication should be understood to alternatively be portions of the same device or element.

Referring now to FIG. 1, the apparatus 100 for finding the logical equivalence between RTL wires and post synthesis nets in a netlist may include or otherwise be in communication with a processor 120, a memory device 140, a communication interface 130, and optionally a user interface 110. In some embodiments, the processor 120 (which may include co-processors or any other processing circuitry associated with the processor) may be in communication with the memory device 140. The memory device 140 may be non-transitory and may include one or more volatile and/or non-volatile memories. In some examples, the memory device 140 may be an electronic storage device (e.g., a computer readable storage medium) comprising gates configured to store data (e.g., bits) that may be retrievable by a machine (e.g., a computing device like the processor). The memory device 140 may be configured to store information, data, content, applications, computer program instructions, or the like for enabling the apparatus to carry out various functions in accordance with the example embodiment of the present invention, described herein.

As described above, the apparatus 100 may be embodied by a computing device, such as a mobile terminal or a fixed computing device. In some embodiments, the apparatus may be embodied as a chip or chip set. For example, the apparatus may comprise one or more physical packages (e.g., chips) including materials, components and/or wires on a structural assembly.

In some examples, the processor 120 may be embodied in a number of different ways. For example, the processor may be embodied as one or more of various hardware processing means such as a microprocessor, a coprocessor, a digital signal processor (DSP), a controller, a processing element with or without an accompanying DSP. The processor 120 may also be embodied on various other processing circuitry including integrated circuits such as, for example, an FPGA (field programmable gate array), a microcontroller unit (MCU), an ASIC (application specific integrated circuit), a hardware accelerator, or a special-purpose electronic chip. Furthermore, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multi-threading.

In an example embodiment, the processor 120 may be configured to execute instructions stored in the memory device 140 or otherwise accessible to the processor 120. Alternatively or additionally, the processor may be configured to execute hard coded functionality. As such, whether configured by hardware or software instructions, or by a combination thereof, the processor 120 may represent a computing entity (e.g., physically embodied in circuitry) configured to perform operations according to an embodiment of the present invention described herein. For example, when the processor 120 is embodied as an ASIC, FPGA or similar, the processor may be configured hardware for conducting the operations of an embodiment of the invention. Alternatively, when the processor 120 is embodied to execute software instructions, the instructions may specifically configure the processor 120 to perform the algorithms and/or operations described herein when the instructions are executed. However, in some cases, the processor 120 may be a processor of a device (e.g., a mobile terminal or a fixed computing device) specifically configured to employ an embodiment of the present invention by further configuration of the processor by instructions for performing the algorithms and/or operations described herein. The processor 120 may further include a clock, an arithmetic logic unit (ALU) and logic gates configured to support operation of the processor 120, among other things.

In some embodiments, the communication interface 130 may be a device or circuitry embodied in either hardware or a combination of hardware and software that is configured to receive and/or transmit data from/to a network and/or any other device or module in communication with the apparatus 100, such as the computing device that includes or is otherwise associated with the display upon which visual representation(s) of the RTL wires or netlist nets may be presented or the display itself in instances in which the apparatus is separate from the computing device and/or the display. In this regard, the communication interface 130 may include, for example, an antenna and supporting hardware and/or software for enabling communications with a wireless communication network. In some environments, the communication interface 130 may alternatively or also support wired communication. As such, for example, the communication interface may include a communication modem and/or other hardware/software for supporting communication via cable, universal serial bus (USB), digital subscriber line (DSL), or other mechanisms In some embodiments, the apparatus 100 may include a user interface 110 in communication with the processor 120 to provide output to a user and, in some embodiments, to receive a user input. For example, the user interface may include a display and, in some embodiments, may also include a keyboard, a mouse, one or more microphones, a speaker, or other input/output mechanisms. In one embodiment, the user interface includes the display upon which visual representation(s) of the RTL wires or netlist nets are presented. Alternatively or additionally, the processor 120 may comprise user interface circuitry configured to control at least some functions of one or more user interface elements such as a display. The processor 120 and/or user interface circuitry comprising the processor 120 may further be configured to control one or more functions of one or more user interface elements through computer program instructions (e.g., software and/or firmware) stored on a memory accessible to the processor such as memory device 140.

FIGS. 2A and 2B provide a visual representation of example netlists, which may be improved by the embodiments, described herein.

FIG. 2A is an example visual representation of a synthesized netlist 200 representing RTL code, such as the example code:
module example(x, y, a, b, c);
input a, b, c;
output x, y;
assign x=~(a^b);
wire d=~(x|c);
assign y=~(d &~b);
endmodule In this example, net a 202, net b 204, and net c 206 are inputs into the example netlist, corresponding to inputs a, b, and c in the RTL code. Net x 220 and net y 222 are example outputs of the netlist, representing outputs x and y of the RTL code. Logic gates 208, 212, 214, and 218 are example logic gates occurring in the netlist, synthesized to produce the output of the RTL code. Nets t1 210, and t2 216 are example net outputs from logic gates prior to the output nets x 220 and y 222.

In this example, the netlist code corresponding to the visual representation of the netlist 200 includes, for example:
module example(x, y, a, b, c);
input a, b, c;
output x, y;
Wire t1;
XOR(a,b,t1);
NOT (t1,x);
AND(x,c,t2);
OR(t2,b,y);
endmodule In the above example, the RTL code contains a bug or error. For example, wire d=~(x|c) is an error in the code. This is thus represented as an error in net t2 216.

FIG. 2B is an example visual representation of a corrected netlist 250, corrected by utilizing the embodiments herein, representing the corrected RTL code, such as the example code:
module example(x, y, a, b, c);
input a, b, c;
output x, y;
assign x=~(a^b);
wire d=~(x|c);
assign y=~(d &~b);
endmodule In this example, net a 202, net b 204, and net c 206 are inputs into the example netlist. Net x 220 and net y 256 are example outputs of the netlist. Logic gates 208, 212, 214, 218, and 254 are example logic gates occurring in the netlist. Nets t1 210, and t2 252 are example net outputs from logic gates prior to the output nets x 220 and y 222.

FIGS. 3A and 3B illustrate the operations performed, such as by the apparatus 100 of FIG. 1, in accordance with an example embodiment. As shown in block 302 of FIG. 3A, the apparatus 100, including the processor 120, may be configured to receive a register transfer level abstraction and a synthesized netlist of the register transfer level abstraction. In some examples, the register transfer level abstraction may be a pre-synthesized RTL code such as the code modules described above in relation to FIGS. 2A and 2B, including code representing RTL wires. In some examples, the synthesized netlist of the register transfer level abstraction may be a list of nets corresponding to the logic of the RTL wires in the RTL code. In some examples, the register transfer level abstraction and a synthesized netlist may include visual representations of the code configured for display on a user interface 110. In some examples, the register transfer level abstraction and a synthesized netlist may be received through communication interface 130. In some examples, the register transfer level abstraction and a synthesized netlist may be stored into a memory 140. In some examples, the apparatus 100 may be configured to receive user input through, for example the user interface 110, in order to construct a register transfer level abstraction, e.g., to write RTL code, and may be configured through the processor 120 to produce a synthesized netlist, e.g., to synthesize the written RTL code, from the user inputted register transfer level abstraction.

As shown in block 304, the apparatus 100, including the processor 120, may be configured to store the register transfer level abstraction and the synthesized netlist into an equivalence representation model. In some examples, the equivalence representation model may be a structured data model configured for further use in finding the logical equivalence between RTL wires and post synthesis nets in a netlist. In some examples, the equivalence representation model may be stored in the memory 140.

As shown in block 306, the apparatus 100, including the processor 120, may be configured to associate one or more netlist terminals with one or more corresponding register transfer level entities, based on a name of the register transfer level entity matching a name of a netlist terminal. For example, in reference to FIG. 2A, inputs a, b, and c in the RTL code module are associated with the corresponding nets of the same name in FIG. 2A, net a 202, net b 204, and net c 206. In some examples, the one or more netlist terminals and the register transfer level entities comprise one of a flip-flop, a register, a wire, an input, or an output.

As shown in block 308, the apparatus 100, including the processor 120, may be configured to simplify the register transfer level abstraction and the synthesized netlist. In some examples, simplifying the RTL abstraction and synthesized netlist includes removing redundant or unneeded RTL wires and netlist nets from the equivalence representation model, as shown in FIG. 5.

As shown in block 310, the apparatus 100, including the processor 120, may be configured to minimize one or more nets in the netlist. In some examples, minimizing the one or more nets in the netlists may include the further functions of blocks 312, 314, and 316.

As shown in block 312, the apparatus 100, including the processor 120, may be configured to determine an immediate operand for each of the one or more nets. For example, an immediate operand may include the constant value or the result of the expression in RTL code after synthesis into nets of a netlist. In some examples, determining if the one or more nets of the netlist are logical equivalents based on the determined immediate operand comprises utilizing a compiled truth table to determine logical equivalents of the netlist nets.

As shown in block 314, the apparatus 100, including the processor 120, may be configured to determine if the one or more nets of the netlist are logical equivalents based on the determined immediate operand. For example, if two nets are determined to have the same immediate operand, the netlists are considered logically equivalent. For example, the netlist code shown in FIG. 2A, may be minimized to include the following minimizations m0, m3, m4:
module example(x, y, a, b, c);
input a, b, c;
output x, y;
Wire t1;
XOR(a,b,t1); a^b minimized into m0
NOT (t1,x);
OR(x,c,t2); x OR c minimized into m3
OR(t2,b,y); minimized to m4
endmodule As shown in block 316, the apparatus 100, including the processor 120, may be configured to associate the one or more determined nets and to store the associations in the equivalence representation model. For example, the minimizations m0, m3, and m4 may be associated with their respective nets and logic and stored in the equivalence representation model.

As shown in block 318, the apparatus 100, including the processor 120, may be configured to match each register transfer level wire to a netlist net. In some examples, minimizing the one or more nets in the netlists includes the further functions of blocks 320, 322, 324, 326, and 328 of FIG. 3B.

As shown in block 320 of FIG. 3B, the apparatus 100 of FIG. 1, including the processor 120, may be configured to traverse the register transfer level abstraction from a bottom wire to a top wire of the abstraction. For example, in the RTL code as described in relation to FIG. 2A, the bottom up order would be, for example, a,b,c,x,d,y. For each level of the traversal further functions may be performed.

For example, as shown in block 322, the apparatus 100, including the processor 120, may be configured to minimize each wire in the register transfer level abstraction. In some examples, minimizing the one or more nets in the netlists includes the further functions of blocks 324, 326, and 328.

As shown in block 324, the apparatus 100, including the processor 120, may be configured to determine immediate operands for each of the one or more register transfer level wires. For example, as shown in relation to FIG. 2A, the netlist code may include the following minimizations m0, m1, and m2
module example(x, y, a, b, c);
input a, b, c;
output x, y;
assign x=~(a^b); a^b minimized into m0
wire d=~(x|c); x|c minimized into m1
assign y=~(d &~b); d &~b minimized to m2
endmodule As shown in block 326, the apparatus 100, including the processor 120, may be configured to determine if the register transfer level wire is a logical equivalent to one or more of the stored associated nets. For example, it may be determined that the a^b minimization m0 in the RTL code is the logical equivalent to a^b minimization m0 in the Netlist Code.

As shown in block 328, the apparatus 100, including the processor 120, may be configured to associate each register transfer wire with a determined equivalent net and store the associations in the equivalence representation model. For example, in the RTL code x=m0 is associated and stored into the equivalence representation model along with the nets representing m0.

As shown in block 330, the apparatus 100, including the processor 120, may be configured to determine from the associations of the entities and terminals if each register transfer level wire is associated with a net of the same name. For example, wires a, b, and c may be matched by their name (inputs) as described in relation to block 306. Moreover, in the depicted example, x is minimized to a netlist net (m0), a further equivalence.

As shown in block 332, the apparatus 100, including the processor 120, may be configured to determine if each wire and net of the same name are logically equivalent. In some examples, determining if each wire and net of the same name are logically equivalent comprises utilizing a satisfiability (SAT) solver, which outputs a Boolean response. In some examples, if an RTL wire is not represented by a net in the netlist, one or more candidate nets must be determined in order to correct the netlist code for the error in the RTL code. For example, wire d, in the example RTL code described in relation to FIG. 2A, is not minimized into the netlist net. Possible candidates for d in the netlist nets can be derived from properties of d, such as the inputs from which d is driven. In the depicted example, d is driven from inputs a, b, and c in the RTL code and netlist net, and the nets driven from the same inputs include t2 and y.

In some examples, utilizing a SAT solver for every possible candidate may be costly in both time and resources. In order to avoid the time and resource cost, the candidate nets may be sorted by the number of common overlapping gates with the RTL wire. The candidate nets may then be checked in the order starting with the nets having the most overlapping gates. For example, a good netlist candidate will overlap a large majority of gates of the RTL wire. In another example, a bad netlist candidate will overlap only a small number of gates with the RTL wire. In both examples, the good netlist candidate and the bad netlist candidate may share the same inputs as the RTL wire.

Thus in some examples, the following equivalences must be answered:
d==t2
d==!t2
d==y
d==!y In some examples, the equivalences are sent to an SAT solver, which returns a Boolean value. For example, in the case depicted above, the SAT solver will return t2==~d is TRUE.

As shown in block 334, the apparatus 100, including the processor 120, may be configured to determine a new candidate for a net if a wire and net of the same name are not logically equivalent. The apparatus 100, including the processor 120, may be further configured to store the new candidate net in the equivalence representation model. For example, given that t2==~d in this example, in order to make the correction reflected in the corrected RTL code described in relation to FIG. 2B (where the bug is eliminated) and to make the netlist net logically equivalent, an inverter, such as inverter 252, must be inserted before t2 to result in an updated net, such as net t2 252.

Referring now to FIG. 4, the operations performed, such as by the apparatus 100 of FIG. 1, in accordance with a further example embodiment are illustrated. As shown in block 402, the apparatus 100, including the processor 120, may be configured to run a simulation for the netlist and for the register transfer level abstraction, prior to matching each register transfer level wire to a netlist net, such as prior to block 318 in the method embodiment described in relation FIG. 3A. For example, a simulation may include an algorithm configured to create random inputs which are used to propagate an output, so that each gate input is given a value that is used to determine a value for each wire immediate operand as shown in the example algorithm:
Input (1)=Output (1);
Input (2)=Output(0);
Wire a=Input(1)^Input(2);
a=1^0=1.

As shown in block 404, the apparatus 100, including the processor 120, may be configured to store a simulation output for the netlist and for register transfer level abstraction in the equivalence representation model. In some examples, the simulation output may be stored with the associations determined in block 316 and in block 328 in relation to FIGS. 3A and 3B.

In some examples, the apparatus 100, including the processor 120, may be further configured to determine if each wire and net of the same name are logically equivalent by performing the steps of blocks 406 and 408.

As shown in block 406, the apparatus 100, including the processor 120, may be configured to determine for each register transfer level wire, every netlist net originating from a same input.

As shown in block 408, the apparatus 100, including the processor 120, may be configured to determine if the determined netlist nets from the same input are logically equivalent by comparing the simulation results for each determined netlist net and register transfer level wire from the same input.

Referring now to FIG. 5, the operations performed, such as by the apparatus 100 of FIG. 1, in accordance with a further example embodiment are illustrated. As shown in block 502, the apparatus 100, including the processor 120, may be configured to determine non-logical nets in the netlist and to turn the determined non-logical nets off or set to zero and removed in the equivalence representation model. In some examples, non-logical nets may include nets used for testing or other services such as scanners, atpg, etc.

As shown in block 504, the apparatus 100, including the processor 120, may be configured to determine which register transfer level entities are not represented by a netlist terminal and to remove the determined entities from the equivalence representation model. In some examples, synthesizing the RTL code may include optimizing the RTL code and eliminating redundant entities. In the depicted example, a redundant flip-flop present in the RTL code, but missing from the netlist terminals, would be removed from the equivalence representation model.

As shown in block 506, the apparatus 100, including the processor 120, may be configured to determine a replacement logic level for the removed entities utilizing a satisfiability (SAT) solver. In the example above, the SAT solver will determine whether the redundant/removed flip-flop signal will be high (1) or low (0) in the netlist.

As shown in block 502, the apparatus 100, including the processor 120, may be configured to store the determined level in the equivalence representation model. For example, the determined signal may be stored as the logic of the removed flip-flop in the equivalence representation model.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method for finding logical equivalence between a register transfer level abstraction and a synthesized netlist comprising:
   receiving a register transfer level abstraction and a synthesized netlist of the register transfer level abstraction in an apparatus, wherein the apparatus comprises a processor configured to run a simulation for the synthesized netlist and the register level abstraction and further comprises a memory configured to store an equivalence representation model of the synthesized netlist and the register level abstraction, wherein the apparatus is configured to provide a mechanism for bug-fixing in a circuit design software;
   storing the register transfer level abstraction and the synthesized netlist into the equivalence representation model in the memory;
   associating, via the processor configured to run the simulation for the synthesized netlist and the register level abstraction, one or more netlist terminals with one or more corresponding register transfer level entities based on a name of the register transfer level entity matching a name of a netlist terminal;
   simplifying the register transfer level abstraction and the synthesized netlist by removing a set of unneeded register transfer level entities in the equivalence representation model stored in the memory;
   minimizing one or more nets in the netlist by:
      determining immediate operands for each of the one or more nets;
      determining if the one or more nets of the netlist are logical equivalents based on the determined immediate operand; and
      associating the one or more determined nets and storing the associations in the equivalence representation model;
   matching each register transfer level wire to a netlist net by:
      traversing the register transfer level abstraction from a bottom wire to a top wire of the abstraction; and
      minimizing each wire in the register transfer level abstraction by:
         determining immediate operands for each of the one or more register transfer level wires;
         determining if the register transfer level wire is a logical equivalent to one or more of the stored associated nets; and
         associating each register transfer wire with a determined equivalent net and storing the associations in the equivalence representation model;
   determining from the associations of the entities and terminals if each register transfer level wire is associated with a net of the same name;
   determining if each wire and net of the same name are logically equivalent by running simulations and comparing a set of simulation results using the processor; and
   determining a new candidate for a net if a wire and net of the same name are not logically equivalent and storing the new candidate net in the equivalence representation model stored in the memory.

2. The method of claim 1, further comprising:
   running a simulation for the netlist and for register transfer level abstraction, prior to matching each register transfer level wire to a netlist net; and
   storing a simulation output for the netlist and for register transfer level abstraction in the equivalence representation model,
   wherein determining if each wire and net of the same name are logically equivalent further comprises:
      determining for each register transfer level wire, every netlist net originating from a same input; and
      determining if the determined netlist nets from the same input are logically equivalent by comparing the simulation results of for the each determined netlist net and register transfer level wire from the same input.

3. The method of claim 1, wherein the processor is further configured to utilize a satisfiability solver, wherein simplifying the register transfer level abstraction and the synthesized netlist further comprises:
  determining non-logical nets in the netlist and turning the determined non-logical nets off in the equivalence representation model; determining which register transfer level entities are not represented by a netlist terminal and removing the determined entities from the equivalence representation model;
  determining a replacement logic level for the removed entities utilizing a satisfiability (SAT) solver via the processor configured to run the simulation for the synthesized netlist and the register level abstraction; and
  storing the determined level in the equivalence representation model.

4. The method of claim 1, wherein determining if each wire and net of the same name are logically equivalent further comprises utilizing a satisfiability (SAT) solver.

5. The method of claim 1, wherein determining if the one or more nets of the netlist are logical equivalents based on the determined immediate operand comprises utilizing a truth table to determine logical equivalents of the netlist nets.

6. The method of claim 1, wherein the one or more netlist terminals and the register transfer level entities comprise one of a flip-flop, a register, a wire, an input, or an output.

7. A computer program product comprising:
  at least one computer readable non-transitory memory medium having program code instructions stored thereon, the program code instructions which when executed by an apparatus cause the apparatus at least to:
    receive a register transfer level abstraction and a synthesized netlist of the register transfer level abstraction in an apparatus, wherein the apparatus comprises a processor configured to run a simulation for the synthesized netlist and the register level abstraction and further comprises a memory configured to store an equivalence representation model of the synthesized netlist and the register level abstraction, wherein the apparatus is configured to provide a mechanism for bug-fixing in a circuit design software;
    store the register transfer level abstraction and the synthesized netlist into the equivalence representation model in the memory;
    associate one or more netlist terminals with one or more corresponding register transfer level entities based on a name of the register transfer level entity matching a name of a netlist terminal;
    simplify the register transfer level abstraction and the synthesized netlist by removing a set of unneeded register transfer level entities in the equivalence representation model stored in the memory;
    minimize one or more nets in the netlist by:
      determining immediate operands for each of the one or more nets;
      determining if the one or more nets of the netlist are logical equivalents based on the determined immediate operand; and
      associating the one or more determined nets and storing the associations in the equivalence representation model;
    match each register transfer level wire to a netlist net by:
      traversing the register transfer level abstraction from a bottom wire to a top wire of the abstraction; and
      minimizing each wire in the register transfer level abstraction by:
        determining immediate operands for each of the one or more register transfer level wires;
        determining if the register transfer level wire is a logical equivalent to one or more of the stored associated nets; and
        associating each register transfer wire with a determined equivalent net and storing the associations in the equivalence representation model;
    determine from the associations of the entities and terminals if each register transfer level wire is associated with a net of the same name;
    determine if each wire and net of the same name are logically equivalent by running simulations and comparing a set of simulation results using the processor; and
    determine a new candidate for a net if a wire and net of the same name are not logically equivalent and store the new candidate net in the equivalence representation model stored in the memory.

8. The computer program product of claim 7, further configured to:
  run a simulation for the netlist and for register transfer level abstraction, prior to matching each register transfer level wire to a netlist net; and
  store a simulation output for the netlist and for register transfer level abstraction in the equivalence representation model;
  determine if each wire and net of the same name are logically equivalent by:
    determining for each register transfer level wire, every netlist net originating from a same input; and
    determining if the determined netlist nets from the same input are logically equivalent by comparing the simulation results of for the each determined netlist net and register transfer level wire from the same input.

9. The computer program product of claim 7, further configured to match each register transfer level wire to a netlist net by:
  traversing the register transfer level abstraction from a bottom wire to a top wire of the abstraction; and
  minimizing each wire in the register transfer level abstraction by:
    determining an immediate operand for each of the one or more register transfer level wire;
    determining if the register transfer level wire is a logical equivalent to one or more of the stored associated nets; and
    associating each register transfer wire with a determined equivalent net and storing the associations in the equivalence representation model.

10. The computer program product of claim 7, further configured to simplify the register transfer level abstraction and the synthesized netlist by:
  determining non-logical nets in the netlist and turning the determined non-logical nets off in the equivalence representation model;
  determining which register transfer level entities are not represented by a netlist terminal and removing the determined entities from the equivalence representation model;
  determining a replacement logic level for the removed entities utilizing a satisfiability (SAT) solver via the processor configured to run the simulation for the synthesized netlist and the register level abstraction; and storing the determined level in the equivalence representation model.

11. The computer program product of claim 7, further configured to determine if each wire and net of the same name are logically equivalent by utilizing a satisfiability (SAT) solver.

12. The computer program product of claim 7, further configured to determine if the one or more nets of the netlist are logical equivalents based on the determined immediate operand by utilizing a truth table to determine logical equivalents of the netlist nets.

13. The computer program product of claim 7, wherein the one or more netlist terminals and the register transfer level entities comprise one of a flip-flop, a register, a wire, an input, or an output.

14. The computer program product of claim 7, further configured to update the netlist net with the stored new candidate net before manufacturing a digital circuit chip.

15. An apparatus comprising at least one processor and at least one memory including computer program code, the at least one memory and the computer program code configured to, with the processor, cause the apparatus to at least:

receive a register transfer level abstraction and a synthesized netlist of the register transfer level abstraction in an apparatus, wherein the apparatus comprises a processor configured to run a simulation for the synthesized netlist and the register level abstraction and further comprises a memory configured to store an equivalence representation model of the synthesized netlist and the register level abstraction, wherein the apparatus is configured to provide a mechanism for bug-fixing in a circuit design software;

store the register transfer level abstraction and the synthesized netlist into the equivalence representation model in the memory;

associate one or more netlist terminals with one or more corresponding register transfer level entities based on a name of the register transfer level entity matching a name of a netlist terminal;

simplify the register transfer level abstraction and the synthesized netlist by removing a set of unneeded register transfer level entities in the equivalence representation model stored in the memory;

minimize one or more nets in the netlist by:
  determining immediate operands for each of the one or more nets; determining if the one or more nets of the netlist are logical equivalents based on the determined immediate operand; and
  associating the one or more determined nets and storing the associations in the equivalence representation model;

match each register transfer level wire to a netlist net by:
  traversing the register transfer level abstraction from a bottom wire to a top wire of the abstraction; and
  minimizing each wire in the register transfer level abstraction by:
    determining immediate operands for each of the one or more register transfer level wires;
    determining if the register transfer level wire is a logical equivalent to one or more of the stored associated nets; and
    associating each register transfer wire with a determined equivalent net and storing the associations in the equivalence representation model;

determine from the associations of the entities and terminals if each register transfer level wire is associated with a net of the same name;

determine if each wire and net of the same name are logically equivalent by running simulations and comparing a set of simulation results using the processor; and determine a new candidate for a net if a wire and net of the same name are not logically equivalent and store the new candidate net in the equivalence representation model stored in the memory.

* * * * *